United States Patent [19]

Morse

[11] Patent Number: 5,340,167
[45] Date of Patent: Aug. 23, 1994

[54] HEAT SHRINKABLE POLYMER HOSE AND TUBING CLAMP

[75] Inventor: George E. Morse, Englewood, Colo.

[73] Assignee: The Gates Rubber COmpany, Denver, Colo.

[21] Appl. No.: 841,951

[22] Filed: Feb. 26, 1992

[51] Int. Cl.$^5$ ............................................. F16L 25/00
[52] U.S. Cl. .................................. 285/243; 285/381; 285/909; 156/86
[58] Field of Search ................... 285/381, 909, 243; 156/86; 24/20 CW, 205, 23 W

[56] References Cited

U.S. PATENT DOCUMENTS

| | | | |
|---|---|---|---|
| 3,315,986 | 4/1967 | Quick | 285/21 |
| 3,539,411 | 11/1970 | Heslop et al. | 285/909 X |
| 3,847,694 | 11/1974 | Stewing | 285/381 X |
| 3,997,195 | 12/1976 | Bartholomew | 285/81 |
| 4,070,044 | 1/1978 | Carrow | 285/381 X |
| 4,092,193 | 5/1978 | Brooks | 156/86 X |
| 4,168,192 | 8/1979 | Nyberg | 156/86 |
| 4,287,012 | 9/1981 | Midgley et al. | 285/381 X |
| 4,578,855 | 4/1986 | Van Der Hagan | 285/909 X |
| 4,585,607 | 4/1986 | Krackeler et al. | 156/86 X |
| 4,636,272 | 1/1987 | Riggs | 156/86 X |
| 4,693,501 | 9/1987 | Logsdon, Jr. et al. | 285/381 X |
| 4,709,948 | 12/1987 | Archer et al. | 156/86 X |
| 4,775,501 | 10/1988 | Rosenzweig et al. | 156/86 X |
| 4,780,158 | 10/1988 | Thomas | 156/86 X |
| 4,813,105 | 3/1989 | Espinoza | 248/74.3 |
| 4,853,165 | 8/1969 | Rosenzweig et al. | 156/86 X |
| 4,896,904 | 1/1990 | Gadsden et al. | 285/381 |
| 5,098,752 | 3/1992 | Chang et al. | 156/86 X |
| 5,169,176 | 12/1992 | Brossard | 156/84 X |

FOREIGN PATENT DOCUMENTS

| | | |
|---|---|---|
| 0253712 | 1/1988 | European Pat. Off. . |
| 0388764 | 9/1990 | European Pat. Off. . |
| 8604542 | 8/1986 | PCT Int'l Appl. . |

*Primary Examiner*—Randolph A. Reese
*Assistant Examiner*—Heather Chun
*Attorney, Agent, or Firm*—Steven G. Austin; H. W. Oberg; C. H. Castleman, Jr.

[57] ABSTRACT

The invention is a device for providing a clamping force about a connection end of elastomeric hose and tubing. The device includes a heat shrinkable polymer, having a diameter reducing release temperature, formed into a band. The band has a first nominal inside diameter defined as the diameter the band assumes upon being shrunk in free space and being smaller than the outside diameter of the connection end of the elastomeric hose and tubing. The band has a second nominal inside diameter defined as the diameter the band assumes upon being shrunk about the connection end of the elastomeric hose and tubing. The band also has a third nominal inside diameter defined as the diameter of the band after polymer orientation and before shrinkage, the third diameter being greater than the outside diameter of the connection end of the elastomeric hose and tubing. The first inside diameter is no greater than about 80 percent of the third inside diameter.

31 Claims, 2 Drawing Sheets

HEAT SHRINKABLE POLYMER HOSE AND TUBING CLAMP

BACKGROUND OF THE INVENTION

1. Field of the Invention

This invention relates generally to the clamping of elastomeric hose and tubing to fixtures and hose coupling devices and to the use of bands of heat shrinkable polymer to provide a constrictive force about elastomeric hose and tubing. More particularly, this invention relates to an improved elastomeric hose and tubing clamp formed of a band of heat shrinkable polymer. Specifically, this invention relates to an improved clamp for sealing hose and tubing to fixtures and couplings associated with automotive coolant systems.

2. Description of the Prior Art

Elastomeric hose (reinforced) and tubing, hereinafter generically referred to as hose, are commonly used to convey various fluids where those fluids are under a variety of pressures and temperatures, as part of fluid transport systems. For these systems to be operable, the connections between hoses and the items with which the hoses fluidically communicate must be fluid tight and able to resist separation that would otherwise occur because of influence from the fluid pressure, or blow-off, as well as surrounding environment, or pull-off.

Commonly, these connections are made by placing the open end of the hose over a stem or coupling insert. The hose and the associated stem or insert are ordinarily sized and shaped to allow the open end of the hose to slip over the stem or insert and to seat with a snug fit. For systems operating at certain pressures and in certain environments, nothing more is required. More typically, however, a hose clamp is installed near the open end of the hose, urging the hose more tightly upon the stem or insert to resist leakage, blow-off, and pull-off.

Hose clamps have been produced in various sizes, shapes, and materials. One common style of hose clamp, the adjustable threaded strap clamp, has included a metal strap with a housing affixed to one end, the housing end. The housing has a space that allows the opposite end of the strap, the free end, to be inserted therethrough such that the strap folds back upon itself to form a band. The housing also contains a threaded screw mechanism. The strap, starting at the opposite end, has a series of indentations or slots that are adapted to mate with the threads of the screw mechanism. In practice this style of hose clamp is wrapped around the hose at the location where clamping is to occur; the free end is inserted into the space of the housing to where the threads and indentations or slots engage; then the screw mechanism is rotated to tighten the clamp.

This style of hose clamp is simple in construction and can produce relatively substantial dynamic and static hoop stresses. Dynamic hoop stress is the constrictive force the clamp exerts upon the clamped object as a result of the inner diameter of the clamp being actively reduced, in this case, by the action of the screw mechanism. The static hoop stress is the constrictive force the clamp exerts upon the clamped object when countering an expansion force being exerted upon the clamp by an active expansive attempt by the clamped object. Depending upon the hose clamp construction at issue, these two stresses can be the same or different. The threaded strap clamp can be expected to produce different dynamic and static hoop stresses. The dynamic hoop stress is expected to be limited by the force the screw mechanism can produce. The static hoop stress is expected to be limited by the point at which the screw becomes disengaged from the indentations or slots.

The threaded strap clamp's relatively substantial hoop stresses produce a connection with a high resistance to blow-off and pull-off. However, the threaded strap clamp suffers from numerous disadvantages. As it is constructed from a strap, it has two relatively sharp edges that ring the connection end of the hose, providing an opportunity for hose damage and failure. Depending upon the metal from which it is formed, it can also be susceptible to corrosion. The screw housing and mechanism protrude from the strap taking up sometimes valuable space and providing a place for objects of the environment to become entangled. The nature of the screw mechanism requires a tool for operation and sometimes valuable free space from which to operate the tool. The clamp is not readily susceptible to automated assembly line installation and is relatively time consuming to install by any method.

The threaded strap clamp's most significant disadvantage, at least in automotive coolant system applications, is its inability to resist cold leaks over time. A cold leak occurs when the coolant system is cold and is the most prevalent and persistent type of leakage problem in modern automotive coolant systems. While old systems are more prone to exhibit such leaks, new systems are not immune to the problem. A common source for cold leakage is where the combination of elasticity and coefficient of thermal expansion of the clamp material is inadequate to follow the contraction of the material of the stem as both cool. After only a few heat cycles of the coolant system, the thermal expansion activity of the stem and clamp causes some of the material of the hose to flow from between the stem and the clamp. This leads to an effective loosening of the clamp. Then as the system cools, the stem shrinks away from the inner surface of the hose, and the seal is broken; the system fluid then leaks.

Cold leaks are also exacerbated when the hose clamp employed exerts non-uniform constrictive force about the circumference of the connection end of the hose. Such non-uniformity also leads to leaks at times other than when the system is cold. In either case, non-uniformity can allow a separation between the stem and the hose, breaking the seal and allowing a leak.

The threaded strap hose clamp also suffers from applying a non-uniform constrictive force, particularly where the housing joins the strap and at the point where the ends of the strap overlap due to both the geometry of the clamp and the relative rigidity of the material of the clamp. Non-uniformity of constrictive force is further increased when irregularity exists in the shape of either the hose or underlying stem, which this style of clamp cannot accommodate. However, the materials of the threaded strap hose clamp tend to be resistant to the chemicals found in the automotive coolant system environment.

Another common style of hose clamp is the screw clamp. This style of clamp is either formed into a band from a strap, as in the threaded strap clamp, or formed into two substantially parallel bands from heavy wire. Projecting radially and outwardly from and near the ends of the band or bands are two stand-offs. One of the stand-offs includes internal threads for receiving a screw; while the other includes a hole that is sized to allow passage of the shank of the screw but not the head. A screw extends between the stand-offs. When the screw is rotated, the clamp is tightened. The screw clamp has characteristics that are very comparable to those of the threaded strap clamp.

Yet another common style of hose clamp is the constant tension spring clamp. The spring clamp is formed of spring material into a band with overlapping ends. Commonly, one of the ends is forked to allow the overlapping to occur with one end interposed between the forks of the other end. An inverted "U" shaped projection extends radially from the forked end. An "I" shaped projection extends radially from the other end. Both projections are end portions of the band bent outwardly. When the two projections are squeezed toward each other, the inner diameter of the clamp increases. In practice, the clamp is held in this expanded position by a cap that is placed upon the two projections; the clamp is positioned over the connection end of the hose; the hose is placed upon the stem or insert; and the cap removed from the projections allowing the clamp to contract upon the hose, clamping the hose onto the stem or insert.

The spring clamp has advantages over the clamp styles previously discussed. It is very susceptible to rapid, modern assembly line installation. Moreover, it is more effective in mitigating cold leaks, if applied with great care. Its improved effectiveness against cold leaks emanates from the greater uniformity with which it constricts about the hose and the characteristic of self-adjustment. The self-adjusted characteristic stems from the spring nature of the clamp; as the hose and the stem change dimension as functions of time and temperature, the clamp correspondingly changes in dimension. There are, however, apparently some severe limitations on the amount of self-adjustment available as self-adjustment has ill effects upon the uniformity of constriction.

The spring clamp has continuously varying amounts of material in relation to angular position around the circumference of the clamp to compensate for a geometry that would otherwise produce significantly varying constrictive force about that circumference. This results in a substantially uniform constrictive force for a given design diameter assumed by the clamp in the presence of a hose. As time and temperature have their affects upon the hose and stem, for which the spring clamp is to adjust, the diameter that the clamp assumes changes. The greater the adjustment deviates from the given design diameter, the greater the non-uniformity of constrictive force. The net result is that a spring clamp is more resistant to cold leaks, but not impervious to them.

Further, the spring clamp projections, like the housing and mechanism of the threaded strap clamp, protrude from the clamp taking up sometimes valuable space and providing a place for objects of the environment to become entangled; and, the materials adaptable to this and all clamps previously discussed are relatively heavy.

All of the previously discussed clamps are necessarily made of materials incapable of accommodating irregularities in the hose and stem shapes.

U.S. Pat. No. 3,315,986, Quick, discloses a different approach to clamping elastomeric hose to a stem or insert. That disclosure indicates placing a heat-shrinkable synthetic resin tube about the elastomeric hose; placing the stem or insert within the connection end of the hose; placing a pyrotechnic material around the assembly; igniting the pyrotechnic material and thereby shrinking the synthetic resin tube and clamping the hose onto the stem or insert. That U.S. patent specifically discloses the use of heat-shrinkable polymerized chloroprene; heat-shrinkable tetrafluoroethylene, and heat-shrinkable polyorgano siloxane elastomers. According to '986, these materials are formed then mechanically expanded. This activity is sometimes referred to as orienting the polymer. The '986 patent specifies the oriented, or expanded, dimensions to be approximately 20 percent greater than the pre-oriented, or pre-expanded, dimensions.

The '986 patent provides as an exemplary application the repairing of a garden hose by use of the materials and method described above. The '986 patent apparently envisions an environment where dynamic and static hoop stresses that are relatively small will suffice, as indicated by the exemplary application offered and the materials specified. Further, the need for self-adjustment by any clamp used in automotive coolant systems, to eliminate cold leakage, was apparently not recognized or addressed. Also, resistance to chemicals commonly found in the automotive coolant system environment was not addressed.

The need remains, particularly in the automotive coolant system environment, for a hose and tubing clamp that; substantially eliminates cold leaks by being self-adjusting over a significant range of thermal and temporal conditions while concurrently providing uniform constrictive force; provides sufficient dynamic and static hoop stresses to resist blow-off and pull-off is capable of conforming to irregularities of hose and stem shapes commonly found in automotive coolant system applications; is adequately resistant to the chemicals of the automotive coolant system environment; is resistent to corrosion; is fast to install and susceptible to modern assembly line installation; is lightweight; and, is devoid of projections that waste space and can be a source for collection of debris.

SUMMARY OF THE INVENTION

Accordingly, the present invention has as an object the provision of a hose and tubing clamp that improves the containment of fluids within fluid transport systems, particularly those systems that relate to automotive coolants.

Another object of the present invention is the provision of a hose and tubing clamp that is self-adjusting over a significant range of thermal and temporal conditions while concurrently providing uniform constrictive force.

Another object of the present invention is the provision of a hose and tubing clamp that is susceptible to rapid installation in the modern assembly line environment.

Another object of the present invention is the provision of a hose and tubing clamp that is lightweight.

Another object of the present invention is the provision of a hose and tubing clamp that provides sufficient dynamic and static hoop stresses to resist blow-off and pull-off in the automotive coolant system environment.

Another object of the present invention is the provision of a hose and tubing clamp that is conformable to irregularities of stem and insert shapes.

Still another object of the present invention is the provision of a hose and tubing clamp that is devoid of projections that waste space and are a source for collection of debris.

To achieve the foregoing and other objects and in accordance with a purpose of the present invention, as embodied and broadly described herein a hose and tubing clamp is disclosed herein.

The invention is a device for providing a clamping force about a connection end of elastomeric hose and tubing. The device includes a heat shrinkable polymer, having a diameter reducing release temperature, formed into a band. The band has a first nominal inside diameter defined as the diameter the band assumes upon being shrunk in free space and being smaller than the outside diameter of the connection end of the elastomeric hose and tubing. The band has a second nominal inside diameter defined as the diameter the band assumes upon being shrunk about the connection end of the elastomeric hose and tubing. The band also has a third nominal inside diameter defined as the diameter of the band after polymer orientation and before shrinkage, the third diameter being greater than the outside diameter of the connection end of the elastomeric hose and tubing. The first inside diameter is no greater than about 80 percent of the third inside diameter.

BRIEF DESCRIPTION OF THE DRAWINGS

The accompanying drawings, which are incorporated in and form a part of the specification and in which like numerals designate like parts, illustrate preferred embodiments of the present invention and together with the description, serve to explain the principles of the invention. In the drawings.

DETAILED DESCRIPTION OF THE PREFERRED EMBODIMENTS

Figure 1:
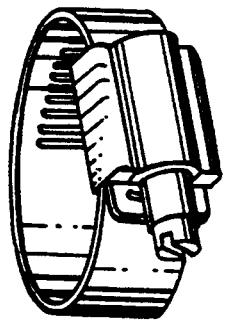
FIG. 1 is a perspective view of a prior art hose and tubing clamp.
Figure 2:
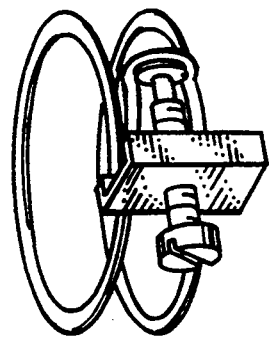
FIG. 2 is a perspective view of another prior art hose and tubing clamp.
Figure 3:
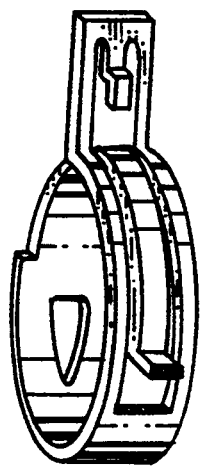
FIG. 3 is a perspective view of another prior art hose and tubing clamp.

Referring to the drawings and particularly to FIGS. 1 through 3, there are shown three prior art hose clamps. As previously described, these FIGS. 1-3 illustrate examples of existing hose clamps, the disadvantages of which are overcome by the present invention.

Figure 4:
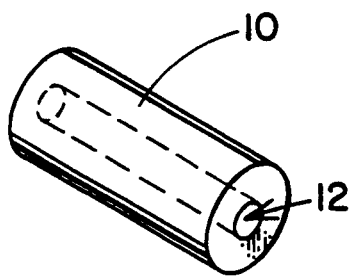
FIG. 4 is a perspective view of a preferred embodiment of the present invention prior to orientation of the heat shrinkable polymer material.

Referring to FIG. 4, there is shown a preferred embodiment of the present invention in the form of a heat shrinkable polymer hose and tubing clamp 10 in its non-oriented, pre-expanded state. The clamp 10 is formed by first extruding a tube of the clamp material with a bore 12, and cut to length, as shown. The tube is then mechanically expanded, taking on the end appearance depicted in FIG. 5 by solid lines. This mechanical expansion is performing polymer orientation, which is the process of mechanically deforming the polymer material so as to generate stress within the polymer structure that can be later released. The stress release is manifest by the polymer material reshaping toward the shape it occupied prior to polymer orientation.

The mechanical expansion is preferably by a factor in the range of about 20 percent to about 600 percent. Mechanical expansion is more preferably by a factor in the range of about 100 percent to about 550 percent, and most preferably by a factor in the range of about 300 percent to about 500 percent. At this juncture, the clamp 10 has an inside diameter that exists during an interim period after polymer orientation yet before shrinkage, defined as the third inside diameter A.

Figure 5:
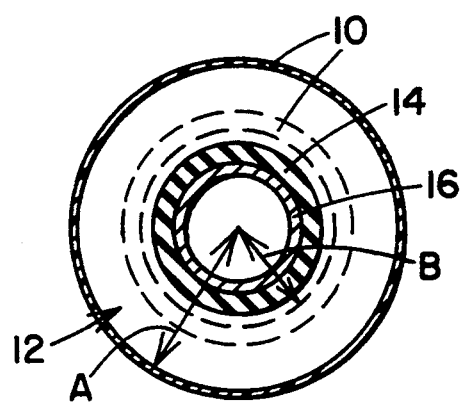
FIG. 5 is an end view of a preferred embodiment illustrating the oriented polymer being heat shrunk into position, taken on the line 5—5 of FIG. 6.
Figure 6:
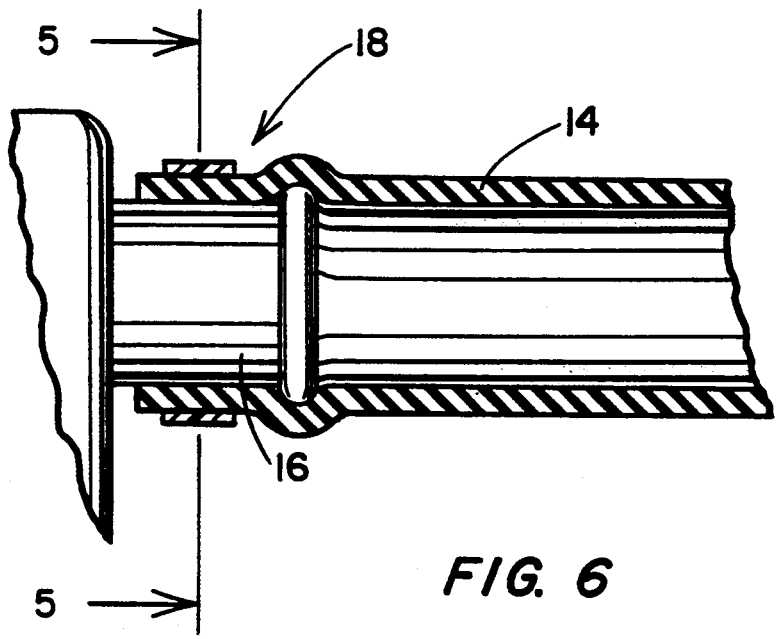
FIG. 6 is a cut-away view depicting a preferred embodiment applied to a hose upon a stem.

At this point, the hose clamp 10 is prepared for placement about the connection end of an elastomeric hose or tubing, for clamping the hose or tubing to a stem or other hose insert 16, as depicted in FIGS. 5 and 6. The stem or other insert 16 can be associated with any fluid transport system. However, such stems and inserts are more preferably associated with systems carrying liquids at temperatures in the range of about $-40°$ C. through about 175° C. In a preferred embodiment, the stems and inserts are associated with automotive engine coolant systems.

The application of the clamp 10 generally involves placing the clamp 10 loosely about the hose 14, can be a reinforced hose or tubing, at the connection end 18, placing the connection end 18 about the stem or insert 16, then heating the clamp 10 to a temperature where shrinkage will occur, referred to as the diameter reducing release temperature. The temperature is maintained at or about the release temperature, at least, until the clamp 10 shrinks down to fit very snugly about the connection end 18, as depicted in FIG. 6 and as dotted lines in FIG. 5. The diameter the clamp 10 has assumed at this point is defined as the second inside diameter B. As the material of the clamp 10 is fairly flexible and the shape of the clamp is without significant discontinuities, it can be seen that the constrictive force applied by the clamp 10 is substantially uniform.

Figure 7:
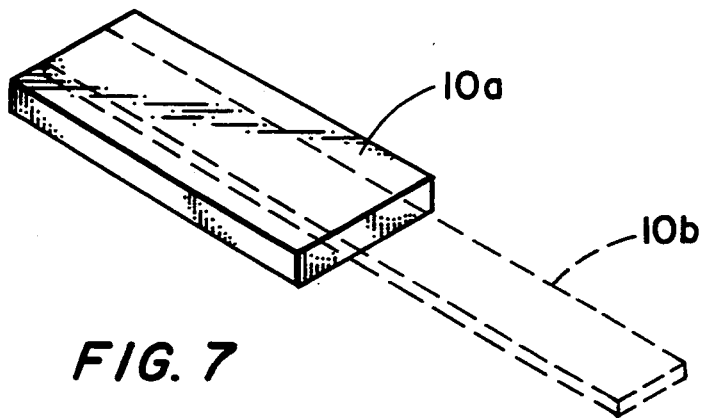
FIG. 7 is a perspective view of another preferred embodiment illustrating the polymer before and after orientation.
Figure 8:
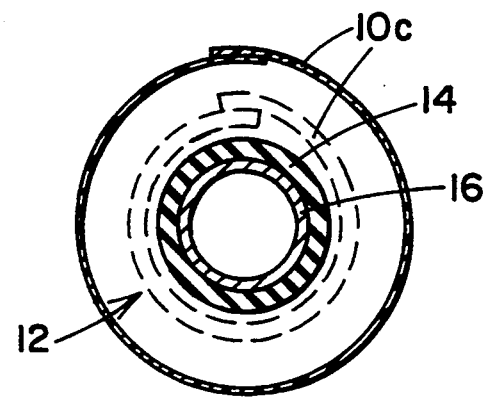
FIG. 8 is an end view of another preferred embodiment illustrating the oriented polymer being heat shrunk into position.

Another preferred embodiment is depicted in FIGS. 7 and 8. Here the material of the clamp 10 is formed into a strip 10a. The strip is then stretched, by the same preferred factors as the previously described embodiment, for polymer orientation, as in FIG. 7. The oriented strip 10b is then folded back on itself to form a band and the overlap is chemically welded, as depicted in solid lines for clamp 10c of FIG. 8. The application of the clamp 10c in this embodiment is the same as that of the previous embodiment. However, this embodiment introduces a significant discontinuity in the clamp 10 at the position where the strip overlaps, giving rise to less uniform constrictive force. Whether this reduction in uniformity provides an opportunity for leakage depends upon the clamp application.

The characteristics of the material used in both previously described embodiments are essentially the same. The diameter reducing release temperature is preferably within the range of about $-40°$ C. through 175° C., or more preferably within the range of 0° C. through 105° C., or most preferably within the range of 35° C. through 75° C. Further, the release temperature can preferably be preselected for an intended application, within the given range, by the choice of temperature at which the material is maintained during polymer orientation. The temperature chosen is the setting temperature. This provides the clamp designer flexibility to design for a variety of applications, as well as a variety of conditions to which the clamp will be subjected during transport and storage.

The material of the clamp preferably tends to shrink every time it is subjected to temperature at or above its release temperature, while restrained from substantial shrinkage by the item being clamped, so long as the material has not reached a shrinkage point that corresponds to the shrinkage that would occur if the clamp was subjected to a temperature above its release temperature for a prolonged period with the clamp standing unrestrained in free space, defined as the first inside diameter (not illustrated). This is referred to as tenacious shrinkage. This is in contrast to those heat shrinkable materials that will shrink only a few times or even just once to a limit defined by its environment then take a set, such that even if unrestrained, the material refuses to ever again shrink appreciably.

The material also has a combination of elasticity and a coefficient of thermal expansion such that the clamp retracts under cooling conditions at least as rapidly as the materials on which the clamp acts. Specific to applications involving automotive coolant systems, the coefficient for the material is greater than 0.2 millimeter per meter per degree Celsius.

The combination of tenacious shrinkage, a relatively high coefficient of thermal expansion and substantial elasticity, gives the clamp the characteristic of self-adjustment, in those applications where the clamp is subjected to temperatures above the selected release temperature, either continuously or periodically. Assuming that the dynamic and static hoop stresses are adequate, self-adjustment coupled with substantial uniformity of constrictive force and conformability to irregularity in stem and insert shapes, gives the clamp the ability to compensate for the effects of temperature and age upon the hose and stem, to eliminate hot leaks as well as cold leaks over the life of the clamp and the associated fluid transport system. The effects of temperature include repeated thermal contraction and expansion. The more significant effects of age include flowing or compression of the hose or tubing material, whereby the hose or tubing walls thin in the proximity of the clamp.

The adequacy of the dynamic and static hoop stresses is dependant upon the hoop stresses the clamp can produce in relation to the application to which it is put. For automotive coolant system application with stems and inserts of common design; the dynamic hoop stress is preferably at least $0.1 \times 10^6$ pascals per centimeter of the second inside diameter, or more preferably $0.5 \times 10^6$; or most preferably $1.1 \times 10^6$ the static hoop stress is preferably at least $10 \times 10^6$ pascals per centimeter of the second inside diameter, or more preferably $25 \times 10^6$, or most preferably $50 \times 10^6$; all over the temperature range of $-40°$ C. through $175°$ C.

To ensure longevity of the efficacy of the clamp, it is necessary that the material exhibit no more than a maximum creep tendency of preferably 7 percent, more preferably 5 percent, or most preferably 3 percent.

In the preferred application to the automotive coolant system the material has a preferred tensile impact strength of at least 1.0 $KJ/m^2$, or a more preferred tensile impact strength of at least 5.0 $KJ/m^2$, or a most preferred 10 $KJ/m^2$; and a preferred minimum impact to break of preferably 0.04 J/m, or more preferably 0.09 J/m, or most preferably 0.4 J/m. The methods used to determine tensile impact strength and minimum impact to break are those described in ASTM 256-88 as IZOD test methods A, C and D. ASTM 256-88 is specifically incorporated herein by reference.

Also for the preferred application, the material is resistant to the common underhood chemicals ethylene glycol, gasoline, motor oil, and automatic transmission fluids types A and F. Gasoline is defined as ASTM Reference Fuel C as described in ASTM D471-79. Motor oil is defined as ASTM Oil No. 3 as described in ASTM D471-79. ASTM D471-79 is specifically incorporated herein by reference. The preferred material's resistance to these fluids is such that when the material is immersed in ethylene glycol and held at a temperature of $22°$ C. for seven days, it retains 101 percent of its original tensile strength, 94 percent of its original elongation before breakage, 86 percent of its original modulus, and swells by less than 1 percent; when immersed in gasoline held at a temperature of $22°$ C. for seven days, it retains 93 percent of its original tensile strength, 94 percent of its original elongation before breakage, 91 percent of its original modulus, and swells by 24 percent; when immersed in gasoline held at a temperature of $70°$ C. for seven days, it retains 105 percent of its original tensile strength, 102 percent of its original elongation before breakage, 92 percent of its original modulus, and swells by 31 percent; when immersed in motor oil held at a temperature of $100°$ C. for seven days, it retains 104 percent of its original tensile strength, 107 percent of its original elongation before breakage, 101 percent of its original modulus, and swells by 11 percent; when immersed in automatic transmission fluid Type A held at a temperature of $100°$ C. for seven days, it retains 109 percent of its original tensile strength, 130 percent of its original elongation before breakage, and swells by 5 percent; and when immersed in automatic transmission fluid Type F held at a temperature of $100°$ C. for seven days, it retains 104 percent of its original tensile strength, 100 percent of its original elongation before breakage, and swells by 5 percent.

The preferred embodiment of the present invention also has the additional benefit of capturing the material of the clamped hose so as to mitigate or prevent flow of the material from in between the clamp and the stem or insert.

The preferred material that meets the preferred characteristics outlined above is marketed by DuPont under the trademark of HYTREL. Other materials having similar characteristics and which meet the criteria set forth above are also envisioned.

The heat shrinkable polymer hose and tubing clamp of the present invention and according to the preferred embodiments is self-adjusting so as to accommodate the effects of temperature and age upon hoses or tubing and stems or inserts. The clamp is of a relatively flexible material which allows it to both exert a uniform constrictive force and to conform to irregularities in the shape of either the hose or stem. Moreover, the clamp tends to capture the hose material which reduces the tendency of the hose material to flow from in between the clamp and the stem. The net result of these characteristics is to provide an improved resistance to hot and cold leaks by the connections clamped by the preferred embodiments of the present invention.

The clamp of the present invention also provides adequate hoop stresses to prevent blow-off and pull-off of hoses associated with automotive coolant systems utilizing stems and inserts of common design. It is adequately resistant to the chemicals of the automotive coolant system environment and adequately resistant to corrosion so as to provide service over a substantial lifetime. It is lightweight and devoid of projections that waste space and can be a source for collection of debris. Moreover, the clamp is fast to install and susceptible to modern assembly line installation. This combination of characteristics and benefits has heretofore been unavailable in hose clamps, particularly hose clamps applied to automotive coolant systems.

The foregoing description and illustrative embodiments of the present invention have been shown in the drawings and described in detail in varying modifications and alternate embodiments. It should be understood, however, that the foregoing description of the invention is exemplary only, and that the scope of the invention is to be limited only to the claims as interpreted in view of prior art. Moreover, the invention illustratively disclosed herein suitably may be practiced in the absence of any element which is not specifically disclosed herein.

What is claimed is:

1. A device for providing a clamping force about a connection end of an elastomeric hose and tubing comprising a heat shrinkable polymer having a diameter reducing release temperature and formed into a band, said band adapted to compress said connection end of said elastomeric hose and tubing about a stem, urging said hose and tubing into sealing contact with said stem and limiting axial movement of said hose and tubing relative to said stem, said band of polymer having a first nominal inside diameter defined as the diameter said band assumes upon being shrunk in free space and being smaller than the outside diameter of said hose connection end, a second nominal inside diameter defined as the diameter said band assumes upon being shrunk about said hose connection end, and a third nominal inside diameter defined as the diameter of said band after polymer orientation and before shrinkage, said third diameter being greater than the outside diameter of said hose connection end, said first inside diameter being no greater than about 80 percent of said third inside diameter wherein said polymer band constricts when said polymer reaches said diameter reducing release temperature and shrinks until achieving said first inside diameter, and wherein said polymer has a coefficient of expansion greater than 0.2 millimeters per meter per degree Celsius, so as to cause said band to self-adjust about said connection end.

2. The device of claim 1, wherein said band constricts to produce a dynamic hoop stress of at least $0.1 \times 10^6$ pascals per centimeter of said second inside diameter over the temperature range of said release temperature through about 175° C.

3. The device of claim 1, wherein said band constricts to produce a static hoop stress of at least $50 \times 10^6$ pascals per centimeter of said second inside diameter over the temperature range of about $-40°$ C. through about 175° C.

4. The device of claim 1, wherein said polymer has a tensile impact strength of at least 1.0 KJ/m$^2$ and a minimum impact to break of 0.04 J/m.

5. The device of claim 1, wherein said polymer has an inherent tensile strength, a post immersion tensile strength, a base elongation, a post immersion elongation, a base modulus, a post immersion modulus, a base volume, and a post immersion volume, and wherein said polymer demonstrates a resistance to being dissolved by ethylene glycol such that when said polymer is immersed in said ethylene glycol maintained at a temperature of 22° C. for a period of seven days, said post immersion tensile strength is at least 80 percent of said inherent tensile strength, said post immersion elongation is at least 90 percent of said base elongation, said post immersion modulus is at least 70 percent of said base modulus, and said post immersion volume is no more than 10 percent more than said base volume.

6. The device of claim 5, wherein said polymer demonstrates a resistance to being dissolved by gasoline such that when said polymer is immersed in said gasoline maintained at a temperature of 22° C. or 70° C. for a period of seven days, said post immersion tensile strength is at least 90 percent of said inherent tensile strength, said post immersion elongation is at least 90 percent of said base elongation, said post immersion modulus is at least 80 percent of said base modulus, and said post immersion volume is no more than 35 percent more than said base volume.

7. The device of claim 5, wherein said polymer demonstrates a resistance to being dissolved by motor oil such that when said polymer is immersed in said motor oil maintained at a temperature of 100° C. for a period of seven days, said post immersion tensile strength is at least 90 percent of said inherent tensile strength, said post immersion elongation is at least 90 percent of said base elongation, said post immersion modulus is at least 80 percent of said base modulus, and said post immersion volume is no more than 35 percent more than said base volume.

8. The device of claim 7, wherein said polymer demonstrates a resistance to being dissolved by automatic transmission fluid, Type F such that when said polymer is immersed in said automatic transmission fluid, Type F maintained at a temperature of 100° C. for a period of seven days, said post immersion tensile strength is at least 90 percent of said inherent tensile strength, said post immersion elongation is at least 90 percent of said base elongation, and said post immersion volume is no more than 35 percent more than said base volume.

9. The device of claim 5, wherein said polymer demonstrates a resistance to being dissolved by automatic transmission fluid, Type A such that when said polymer is immersed in said automatic transmission fluid, Type A maintained at a temperature of 100° C. for a period of seven days, said post immersion tensile strength is at least 90 percent of said inherent tensile strength, said post immersion elongation is at least 90 percent of said base elongation, and said post immersion volume is no more than 35 percent more than said base volume.

10. The device of claim 1, wherein said polymer band has a creep tendency of less than 7 percent over the temperature range of about $-40°$ C. through about 175° C.

11. The device of claim 1, wherein the said band has variable preselected release temperature within the range of about 35° C. through about 105° C.

12. The device of claim 11, wherein said release temperature preselection is effected by selecting a setting temperature.

13. The devise of claim 1, wherein said hose and tubing clamp being of less than two complete overlapping layers.

14. A self-adjusting hose and tubing clamp for providing a clamping force about connection ends of elastomeric hose and tubing and stems associated with automotive coolant systems comprising an oriented polymer in the form of a ring sized and shaped to be radially disposed about said connection end of said elastomeric hose and tubing to create a clamping force by heat shrinkage, said clamping force urging said elastomeric hose and tubing toward tight and sealing engagement with said stem, and acting to resist axial movement of said elastomeric hose and tubing relative to said stem, said shrinkage first occurring at an appreciable rate at a preset diameter reducing release temperature, said ring having a first nominal inside diameter defined as the diameter said ring assumes upon being shrunk in free space and being smaller than the outside diameter of said hose connection end, a second nominal inside diameter defined as the diameter said ring assumes upon being shrunk about said connection end, and a third nominal inside diameter defined as the diameter of said ring after polymer orientation and before shrinkage, said third inside diameter being greater than the outside diameter of said connection end, said first outside diameter being no greater than about 80 percent of said third inside diameter wherein said oriented polymer tends to continue to shrink upon each occurrence of said polymer reaching said release temperature, said polymer having a coefficient of expansion greater than 0.2 millimeters per meter per degree Celsius, so as to cause said clamp to self-adjust about said connection end.

15. The device of claim 14, wherein said clamp constricts to produce a dynamic hoop stress of at least $0.1 \times 10^6$ pascals per centimeter of said second inside diameter over the temperature range of said release temperature through about 175° C.

16. The device of claim 14, wherein said clamp constricts to product a static hoop stress of at least $5 \times 10^6$ pascals per centimeter of second inside diameter over the temperature range of about −40° C. through about 175° C.

17. The device of claim 16, wherein said polymer includes a creep tendency of less than 7 percent over the temperature range of about −40° C. through about 175° C.

18. The device of claim 16, wherein said preset release temperature is in the range of about 35° C. through about 105° C.

19. The device of claim 18, wherein said release temperature is variably preselectable within said range of about 35° C. through about 75° C.

20. The device of claim 19, wherein said release temperature preselection is effected by selecting a clamp setting temperature.

21. The device of claim 14, wherein said polymer includes a tensile impact strength of at least 1.0 KJ/m² and a minimum impact to break of 0.04 J/M.

22. The device of claim 14, wherein said polymer has an inherent tensile strength, a post immersion tensile strength, a base elongation, a post immersion elongation, a base modulus, a post immersion modulus, a base volume, and a post immersion volume, and wherein said polymer demonstrates a resistance to being dissolved by ethylene glycol such that when said polymer is immersed in said ethylene glycol maintained at a temperature of 22° C. for a period of seven days, said post immersion tensile strength is at least 80 percent of said inherent tensile strength, said post immersion elongation is at least 90 percent of said base elongation, said post immersion modulus is at least 70 percent of said base modulus, and said post immersion volume is no more than 10 percent more than said base volume.

23. The device of claim 22, wherein said polymer demonstrates a resistance to being dissolved by gasoline such that when said polymer is immersed in said gasoline maintained at a temperature of 22° C. or 70° C. for a period of seven days, said post immersion tensile strength is at least 90 percent of said inherent tensile strength, said post immersion elongation is at least 90 percent of said base elongation, said post immersion modulus is at least 80 percent of said base modulus, and said post immersion volume is nor more than 35 percent more than said base volume.

24. The device of claim 22, wherein said polymer demonstrates a resistance to being dissolved by motor oil such that when said polymer is immersed in said motor oil maintained at a temperature of 100° C. for a period of seven days, said post immersion tensile strength is at least 90 percent of said inherent tensile strength, said post immersion elongation is at least 90 percent of said base elongation, said post immersion modulus is at least 80 percent of said base modulus, and said post immersion volume is nor more than 35 percent more than said base volume.

25. The device of claim 22, wherein said polymer demonstrates a resistance to being dissolved by automatic transmission fluid, Type F such that when said polymer is immersed in said automatic transmission fluid, Type F maintained at a temperature of 100° C. for a period of seven days, said post immersion tensile strength is at least 90 percent of said inherent tensile strength, said post immersion elongation is at least 90 percent of said base elongation, and said post immersion volume is no more than 35 percent more than said base volume.

26. The device of claim 22, wherein said polymer demonstrates a resistance to being dissolved by automatic transmission fluid, Type A such that when said polymer is immersed in said automatic transmission fluid, Type A maintained at a temperature of 100° C. for a period of seven days, said post immersion tensile strength is at least 90 percent of said inherent tensile strength, said post immersion elongation is at least 90 percent of said base elongation, and said post immersion volume is no more than 35 percent more than said base volume.

27. The device of claim 14, wherein said elastomer is a copolymer.

28. The device of claim 27, wherein said copolymer is a copolyester.

29. The devise of claim 14, wherein said hose and tubing clamp being of less than two complete overlapping layers.

30. An elastomeric hose, stem and self-adjusting hose and tubing clamp assembly comprising: said elastomeric hose with a connection end; said stem inserted within said connection end; and said hose and tubing clamp of an oriented polymer in the form of a ring radially disposed about said connection end, creating a clamping force by heat shrinkage, that sealingly engages said elastomeric hose and tubing and limits axial movement of said hose relative to said stem wherein said oriented polymer tends to continue to shrink upon each occurrence of said polymer reaching said release temperature, said polymer having a coefficient of expansion greater than 0.2 millimeters per meter per degree Celsius, so as to cause said clamp to self-adjust about said connection end.

31. The devise of claim 30, wherein said hose and tubing clamp being of less than two complete overlapping layers.

* * * * *